US010291670B1

(12) United States Patent
Grant et al.

(10) Patent No.: US 10,291,670 B1
(45) Date of Patent: May 14, 2019

(54) VIRTUAL CYPHER ENTERPRISE

(71) Applicant: CypherLive LLC, Owings Mills, MD (US)

(72) Inventors: Michael Grant, Baltimore, MD (US); Kimberly McLean, Baltimore, MD (US)

(73) Assignee: CypherLive LLC, Owings Mills, MD (US)

( * ) Notice: Subject to any disclaimer, the term of this patent is extended or adjusted under 35 U.S.C. 154(b) by 0 days.

(21) Appl. No.: 15/904,417

(22) Filed: Feb. 25, 2018

(51) Int. Cl.
| | |
|---|---|
| *G06F 15/16* | (2006.01) |
| *H04L 29/06* | (2006.01) |
| *H04N 21/2187* | (2011.01) |
| *H04N 21/472* | (2011.01) |
| *H04N 21/258* | (2011.01) |

(52) U.S. Cl.
CPC ...... *H04L 65/4076* (2013.01); *H04L 65/4084* (2013.01); *H04N 21/2187* (2013.01); *H04N 21/25891* (2013.01); *H04N 21/472* (2013.01)

(58) Field of Classification Search
USPC ........................................................ 709/217
See application file for complete search history.

(56) References Cited

U.S. PATENT DOCUMENTS

| | | | |
|---|---|---|---|
| 6,152,824 A | 11/2000 | Rothschild et al. | |
| 6,898,637 B2 | 5/2005 | Curtin | |
| 8,035,020 B2 | 10/2011 | Taub et al. | |
| 8,487,173 B2 | 7/2013 | Emmerson | |
| 8,583,758 B2 * | 11/2013 | Casey | G06F 17/30017 370/466 |
| 9,393,486 B2 * | 7/2016 | George | A63F 13/00 |
| 9,954,646 B1 * | 4/2018 | Marcin | H04L 1/0041 |
| 10,015,224 B1 * | 7/2018 | Shen | H04N 21/2187 |
| 2007/0039449 A1 | 2/2007 | Redmann | |
| 2010/0319518 A1 | 12/2010 | Mehta | |
| 2012/0096371 A1 | 4/2012 | D'Anna | |
| 2018/0167656 A1 * | 6/2018 | Ortiz | H04N 21/254 |

OTHER PUBLICATIONS

Hamilton et al., "Streaming on Twitch: Fostering Participatory Communities of Play within Live Mixed Media." Proceedings of the SIGCHI Conference on Human Factors in Computing Systems. ACM, 2014, pp. 1315-1324. (Year: 2014).*

* cited by examiner

*Primary Examiner* — Alicia Baturay
(74) *Attorney, Agent, or Firm* — McLean Law LLC; Kimberly McLean, Esq.

(57) ABSTRACT

A virtual cypher system for providing online real-time performances. The virtual cypher system creates a virtual cypher for providing sequential online real-time performances based on a filtering scheme using customizable user selected features. The virtual cypher system generates a user profile page for each new user, determines whether a virtual cypher exists for a category and performance selection chosen by a user, creates a virtual cypher in conformance with the customizable user selected features when the system determines that a virtual cypher does not already exist for the category and performance selection, and adds the user to a waitlist queue. Further, the virtual cypher system initiates, in sequential order, a content-specific real-time performance corresponding to the performance selection, for each user in the waitlist queue, and transmits received real-time streaming data corresponding to the performance by each user to viewers of the virtual cypher.

20 Claims, 3 Drawing Sheets

USER PROFILE

| User Name | Photo | User Connections | User Content Subscriptions | User Generated Content |
|---|---|---|---|---|
| | | | | |

FIG. 2

AC DATABASE TABLE

| Cypher Name | Category | Performance Selection | Performance Size | Performance Time | Performers | Viewers |
|---|---|---|---|---|---|---|
| | | | | | | |

VIRTUAL CYPHER ENTERPRISE

FIELD OF THE INVENTION

Embodiments described herein generally relate to real-time media streaming, and more particularly to systems and methods for providing sequential streams of real-time performances.

BACKGROUND OF THE INVENTION

Real-time streaming is a popular form of web content used by many people, particularly for viewing live experiences. Current real-time streaming platforms do not provide any filtering schemes based on user customizable features. This non-conventional technique improves the user's experience by efficiently providing continuous streams of user desired content-specific real-time streaming performances from a community of users.

BRIEF DESCRIPTION OF THE DRAWINGS

The various advantages of the embodiments of the present disclosure will become apparent to one skilled in the art by reading the following specification and appended claims, and by referencing the following drawings, in which:

FIG. 2 is an example of a user profile according to an embodiment of the present disclosure;

FIG. 3 is an example of an AC database record according to an embodiment of the present disclosure;

SUMMARY OF THE INVENTION

Figure 1:
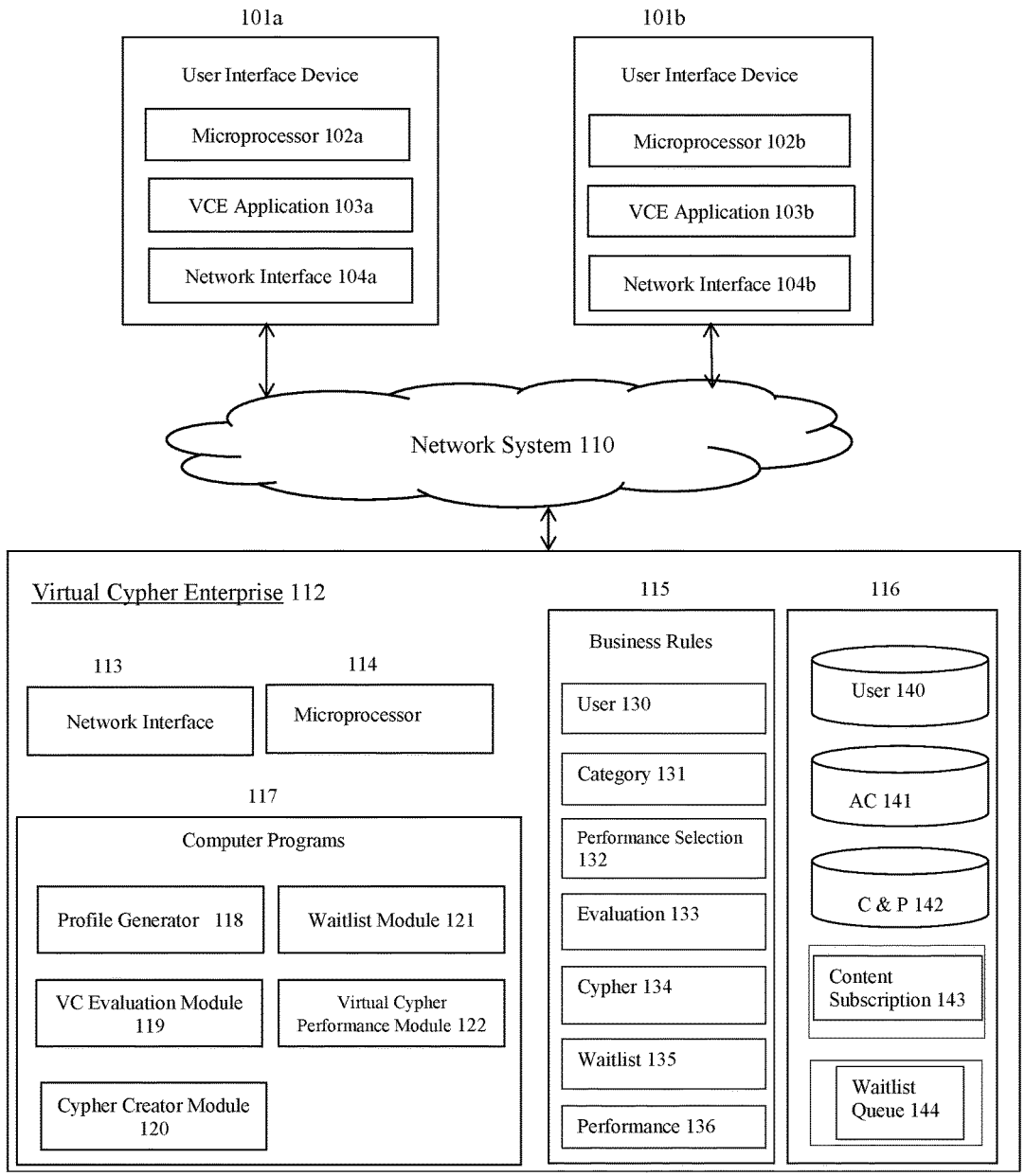
FIG. 1 shows an exemplary high-level block diagram of a computer system configured to operate according to an embodiment of the present disclosure.

Exemplary embodiments disclosed herein describe a computer system and method for creating a virtual cypher for providing content-specific real-time performances based on a filtering scheme using customizable user selected features. The method includes generating on the virtual cypher enterprise a user profile page for a new user; determining on the virtual cypher enterprise whether a virtual cypher has been created for a category and performance selection when a cypher request is received from a user, the category and performance selection are received with the cypher request; creating on the virtual cypher enterprise a virtual cypher conforming to a user's customizable selected features when the virtual cypher enterprise determines that a virtual cypher has not been created for the category and performance selection; adding, on the virtual cypher enterprise, the user to a waitlist queue for the virtual cypher; initiating, on the virtual cypher enterprise, in sequential order, a content-specific real-time performance corresponding to the performance selection for each user in the waitlist queue; and transmitting on the virtual cypher enterprise the real-time streaming data to viewers of the virtual cypher.

In some exemplary embodiments, the virtual cypher links users to a logical streaming channel to send and receive content-specific real-time performances.

In some exemplary embodiments, the users are linked to the logical streaming channel in a database record.

In some exemplary embodiments, the customizable user selected features include a category, a performance selection, a performance size and a performance time.

In some exemplary embodiments, the performance size includes at least one from the group comprising i) individual user and ii) collective users.

In some exemplary embodiments, each performance having a collective users size includes performances made by multiple users during the same performance time.

In some exemplary embodiments, the content-specific real-time performance has a time duration for the performance based on the performance time.

In some exemplary embodiments, each virtual cypher has an associated waitlist queue and timer.

In some exemplary embodiments, the category includes at least one from the group comprising: i) music, ii) religious/spiritual text, iii) exercise/fitness, iv) dance, or v) recipes.

In some exemplary embodiments, each user interface device includes a camera for capturing real-time video and a microphone for capturing audio.

According to another aspect of the present disclosure, there is provided an apparatus for creating a virtual cypher for providing online real-time performances based on a filtering scheme using customizable user selected features, including at least one user interface device, a network system, a virtual cypher enterprise ("VCE"), and an electronic communication channel. In some exemplary embodiments, the apparatus includes a buffer for receiving real-time streaming data corresponding to the performance for each user. The electronic communication channel transmits real-time streaming data received from the buffer to viewers of the virtual cypher.

The virtual cypher enterprise includes at least one hardware microprocessor configured to perform a predefined set of logic operations in response to receiving a corresponding basic instruction selected from a predefined native instruction set of machine codes; a memory; a first database, stored in the memory, for storing performance selection data; a second database, stored in the memory, for storing user profiles; a network interface; a profile generator module, stored in the memory, having program instructions that, when executed by the microprocessor, cause the microprocessor to generate a user profile page for a new user; a determination module, stored in the memory, having program instructions that, when executed by the microprocessor, cause the microprocessor to determine whether a virtual cypher has been created for a category and performance selection when a cypher request is from a user, the category and performance selection are received with the cypher request; a cypher creator module, stored in the memory, having program instructions that, when executed by the microprocessor, cause the microprocessor to create a virtual cypher conforming to a user's customizable selected features when the virtual cypher enterprise determines that a virtual cypher has not been created for the category and performance selection; a waitlist module, stored in the memory, having program instructions that, when executed by the microprocessor, cause the microprocessor to add the user to a waitlist queue for the virtual cypher; a virtual cypher performance module, stored in the memory, having program instructions that, when executed by the microprocessor, cause the microprocessor to initiate, in sequential order, a content-specific real-time performance corresponding to the performance selection, for each user in the waitlist queue.

In some exemplary embodiments, the virtual cypher links users to a logical streaming channel to send and receive content-specific real-time performances.

In some exemplary embodiments, the users are linked to the logical streaming channel in a database record.

In some exemplary embodiments, the customizable user selected features include a category, a performance selection, a performance size and a performance time.

In some exemplary embodiments, the performance size includes at least one from the group comprising i) individual user and ii) collective users.

In some exemplary embodiments, each performance having a collective users size includes performances made by multiple users during the same performance time.

In some exemplary embodiments, the content-specific real-time performance has a time duration for the performance based on the performance time.

In some exemplary embodiments, each virtual cypher has an associated waitlist queue and timer.

In some exemplary embodiments, the category includes at least one from the group comprising of i) music, ii) religious/spiritual text, iii) exercise/fitness, iv) dance, or v) recipes.

In some exemplary embodiments, each user interface device includes a camera for capturing real-time video and a microphone for capturing audio.

DETAILED DESCRIPTION

The present disclosure describes a virtual cypher enterprise ("VCE"). The VCE provides an efficient filtering scheme using customizable user selected features to provide a centralized hub for content-specific real-time streaming data. The customizable features are used to create a content-specific virtual cypher. A virtual cypher is a continuous stream of content-specific real-time performances by user-performers. The user-performers may perform individually or collectively in real-time to a same performance selection in a sequential order. The virtual cypher provides viewing of back to back real-time performances by the user-performers to the user-viewers of the VCE.

The filtering scheme uses customizable user selected features, such as, for example, performance size (e.g., individual/collective), category, performance selection, and performance time. The VCE creates a virtual cypher according to the customizable user selected features. The created virtual cypher will provide continuous real-time streaming data of performances, wherein each performance is of the selected performance size and time and includes content-specific to the category and performance selection. When a user selects individual performances, the virtual cypher will provide continuous real-time performances by the individual users in sequential order. When a user selects collective performances, the virtual cypher will provide continuous real-time collective performances by multiple users.

Users may utilize a virtual cypher for a variety of reasons, such as, for example, information gathering, entertainment, consumer feedback, marketing, collaborations, etc. For information gathering purposes, the virtual cypher may provide a centralized hub for dissemination of information pertaining to specific content. For example, a virtual cypher for a religious text/scripture category will provide a continuous stream of real-time performances related to content-specific to the religious text/scripture category. Hence, viewers of the VCE viewing the content of the virtual cypher will be able to view continuous performances (e.g., sermons), by a number of users, of specific content (e.g., a biblical scripture).

For entertainment purposes, for example, a virtual cypher may be created to facilitate "battles" between users. Each user wishing to participate in the battle (i.e., competition) can join the virtual cypher. User-viewers viewing the performances on the virtual cypher can rate or evaluate each user's performance.

Moreover, a virtual cypher may also be used to gather feedback from viewers of the virtual cypher. A user may be, for example, a music producer or a song writer, and the user may create a virtual cypher to allow other users to perform to a performance selection created by the user, to obtain feedback from the user-viewers of the virtual cypher. The user-viewers of the virtual cypher can leave feedback regarding the performances on the user's profile page or in a user reaction visual display area of the virtual cypher.

The Exemplary Computer System

FIG. 1 shows an example of an overall computer system for creating a virtual cypher for providing sequential online real-time performances. The computer system includes a virtual cypher enterprise ("VCE") 112, user interface devices 101a-b, and network system 110. Although not shown, the computer system includes one or more electronic communications channels for transmitting data between user interface devices 101a-b, network system 110, and VCE 112. While a limited number of user interface devices, network system and VCE have been shown, any number of these elements may be used.

Virtual Cypher Enterprise

As illustrated in FIG. 1, the computer system includes an exemplary virtual cypher enterprise ("VCE") 112 according to one embodiment of the present disclosure. As shown in FIG. 1, the VCE 112 includes a network interface 113, a microprocessor 114, computer programs 117 comprising a collection of software modules 118, 119, 120, 121 and 122, a set of business rules 115 comprising 130, 131, 132, 133, 134, 135 and 136, and memory 116, which comprises a plurality of files and/or databases 140, 141, 142, 143, waitlist queue 144 and a buffer (not shown). As processing is performed in the VCE, outputs, such as, for example, real-time streaming data may be provided to user interface devices 101a-b. A network interface 113 is provided to establish a connection to user interface devices 101a-b. The network interface 113 may also provide connectivity to remote terminals and remote computer systems (not shown) operated by other human users who wish to access and use the VCE 112.

The VCE 112 can be any general purpose, programmable digital computing device including, for example, a personal computer, a programmable logic controller, a distributed control system, or other computing device. The VCE can include a central processing unit (CPU) or microprocessor, random access memory (RAM), non-volatile secondary storage (e.g., a hard drive, a floppy drive, and a CD-ROM drive), and network interfaces (e.g., a wired or wireless Ethernet card and a digital and/or analog input/output card). VCE can include a media streaming server and a web server.

Program code, such as the code comprised in computer programs 117, and program data, such as business rules 115, can be loaded into the RAM from the non-volatile secondary storage and provided to the microprocessor 114 for execution. The microprocessor 114 can generate and store results on the data storage device for subsequent access, display, output and/or transmission to other computer systems and computer programs.

The computer programs 117, which may comprise multiple hardware or software modules, discussed hereinafter, contain program instructions that cause the microprocessor 114 to perform a variety of specific tasks required to parse, extract, index and tag data contained in the databases stored in memory 116. Additionally, the program instructions cause the microprocessor to store data in memory 116. These software modules are flexible and may be configured to use a large variety of different business rules, including without limitation, user 130, category 131, performance selection 132, evaluation 133, cypher 134, waitlist 135, and performance 136. The purpose and function of each one of the computer software modules in the computer programs 117 will now be described in more detail below.

The computer programs contain program instructions that are converted to executable code. The executable code is committed to memory using machine codes selected from the specific machine language instruction set, or native instructions, designed into the hardware microprocessor. The hardware microprocessor is configured to perform a predefined set of logic operations in response to receiving a corresponding basic instruction selected from a predefined native instruction set of machine codes. Each native instruction is a discrete code that is recognized by the hardware microprocessor and that can specify particular registers for arithmetic, addressing, or control functions; particular memory locations or offsets; and particular addressing modes used to interpret operands. The program instructions are a set of machine codes selected from the native instruction set that are processed by the hardware microprocessor.

Profile Generator

The profile generator module 118 in the computer programs 117 contains instructions that when executed by the microprocessor 114, cause the microprocessor to generate a profile for the user and store received data associated with the user in the user's profile in user database 140. The profile generator module 118 receives a new user registration request from at least one of user interface devices 101a-b. The profile generator module generates a profile for the user and stores the profile in the user database. After the profile is generated for the user, the profile generator module continues to receive data associated with the user from at least one of user interface devices 101a-b. The profile generator reads the received data and stores the contents in the appropriate field of the user's profile. The user 130 business rules are used to process and store the received data.

As illustrated in FIG. 2, the user's profile may include user identification information, such as, for example, "User Name" and "Photo". The user's profile may also include "User Connections", "User Content Subscriptions" and "User Generated Content". The user's connections may include, for example, a list of other users that are members of the user's social community. Each user may join another user's social community by sending the user a request. If the user accepts the request, then the requesting user will join that user's social community. All of the users that join another user's social community will be able to view the content on the user's profile page and will receive notifications when new user generated content (e.g., a virtual cypher performance) is added to the page (i.e., user's social community).

The user's content subscriptions, may include, for example, a list of the type of content the user would like to receive in its social community, such as, for example, streaming content from a virtual cypher. In addition, each user may subscribe to other forms of content, such as, for example, news forums, blogs, discussion boards, applications, e-services, images, audio and video files and Web pages. The content subscription database 143 stores the list of content subscriptions for each user.

The user generated content may include, for example, any form of content such as video, blogs, discussion form posts, digital images, audio files, and other forms of media. A profile page (i.e., web page) is created on the VCE for each user using the user's profile information. Each user profile page is stored in user database 140.

Each user of the VCE may operate as a user-performer, a user-viewer or a user-producer. User-performers may perform to the performance selection chosen for the category corresponding to the virtual cypher. User-viewers may view the performances, and in some exemplary embodiments, the user-viewers may provide reactions/responses to the performances. User-producers may create one or more performance selections that are stored in C&P database 142. The terms performers and user-performers are used interchangeably throughout the present disclosure. The terms viewers and user-viewers are used interchangeably throughout this disclosure.

VC Evaluation

The VC evaluation module 119 in the computer programs 117 contains instructions that when executed by the microprocessor 114, cause the microprocessor to determine whether a virtual cypher has been created for a category and performance selection when a cypher request is received from a user. The cypher request includes customizable user selection features, such as, for example, category and performance selection. The VC evaluation module extracts the category and performance selection from the received request and searches the active cypher ("AC") database 141 for a match. The AC database stores the category and performance selection for each active cypher. The VC evaluation module sends a match_found signal, along with the user-performer's name and the network address of the user performer's user interface device 101, to the waitlist module 121 when a match is found. The VC evaluation module may be configured to utilize a document schema to parse and extract content in the AC database. The category 131, performance selection 132, and evaluation 133 business rules are used to process category and performance selection data, and the database's content.

Each virtual cypher corresponds to a specific category and performance selection. The category can include any subject matter, such as, for example, music, religious text/scripture, fitness/exercise, recipe, dance, financial/money, fundraising, etc. When a user makes a request to start a virtual cypher, the user is required to select a category and a performance selection from the C&P database 142. The performance selections stored in C&P database may include performance selections created by a user-producer. When the virtual cypher is created, the chosen category and performance selections are stored in the AC database 141. The AC database may be, for example, an in-memory database.

The performance selection for the music category can include music from any genre, such as, for example, hip hop, country, pop, rhythm and blues, etc. The performance selection for the religious text/scripture category can include, scriptures or texts from a particular religious source, such as, for example, the "New International Version Bible" (NIV Bible). The performance selection from the NIV Bible can be, for example, "Psalms 20:4". The performance selection for the fitness/exercise category can include exercises for an identified area of the body, such as, for example, exercises for abs.

VC Creator

The VC creator module 120 in the computer programs 117 contains instructions that when executed by the microprocessor 114, cause the microprocessor to create a virtual cypher for the category and performance selection when it is determined that a virtual cypher has not been created for the category and performance selection received in the user cypher request. The VC creator module receives the category and performance selection chosen by the user. Also, the VC creator modules receives the performance size and time selected by the user. The category 131, performance selection 132, and cypher 134 business rules are used to process the user selection content.

The virtual cypher creator may create the virtual cypher, for example, by linking user-performers and user-viewers to a logical streaming channel for sending and receiving the content-specific real-time performances. The user-performers may be linked to the logical streaming channel, for example, based on a cypher request from the user-performer. The cypher request may be, for example, a request to start a virtual cypher having a category and performance selection. The user-performer that makes the first request to create the virtual cypher is linked to the logical streaming channel, and all subsequent user-performers making a start or join cypher request with a category and performance selection the same as the first requests will be linked to the logical streaming channel and added to the virtual cypher's waitlist queue 144.

The user-viewers may be linked to the logical streaming channel, for example, based on the user-viewers' content subscriptions. The content subscriptions can be based on, for example, the category, or the category and performance selection. Moreover, for example, the content subscriptions can be based on the users. The user-viewers of the VCE may establish connections with other users (i.e., join the user's social community). A user-viewer may, for example, subscribe to the content streamed by those users with whom the viewer has a connection.

In some exemplary embodiments, the user-viewers may be linked to the logical streaming channel for the content-specific real-time performances based on a viewing request made by the user-viewer for the specific virtual cypher.

The user-viewers are linked to the logical streaming channel for the content-specific real-time performances using a table in the AC database 141. When a virtual cypher is created, a table entry is made in the AC database. The table entry may include, for example, the fields as illustrated in FIG. 3.

The "Cypher Name" field identifies the name designated for the logical streaming channel corresponding to the virtual cypher. The header information associated with each performance received from the user-performers within the same virtual cypher will identify the cypher name as the virtual destination. The VCE 112 will route/send each performance to all the viewers linked to the logical streaming channel.

The "Category", "Performance Selection", "Performance Size", and "Performance Time" fields all correspond to the customizable user selection features selected by the user. The "Performers" field identifies the user-performer's user name and the network address of the user-performer's interface device 101 for each user-performer in the virtual cypher and the "Viewers" field identifies the user-viewer's user name and the network address of the user-viewer's interface device 101 for each user-viewer linked to the virtual cypher. When the user-performers and user-viewers are linked to a virtual cypher, the VCE sends a request to the user's interface device 101 to obtain its network address.

The table identifies to the VCE 112 that cypher name (X), receives performances (P) to performance selection (Ps), which conform to performance size (S) and performance time (T), from performers (P1) . . . (Pn), and the performances are sent to viewers (V1) . . . (Vn).

The virtual cypher created by the VC creator will conform to the customizable user selection features. For example, when the user selects the music category and a performance selection, such as, for example, a hip-hop song, a virtual cypher will be created specifically for that music performance selection [i.e. content-specific] chosen by the user. The performance size and performance time will conform to the user selected size and time.

The Waitlist Module

The waitlist module 121 in the computer programs 117 contains instructions that when executed by the microprocessor 114, cause the microprocessor to add a user to a waitlist queue 144. Each active cypher has a waitlist queue stored in memory 116. The queue may be, for example, a first-in-first-out queue. The user 130 and waitlist 135 business rules are used to process the content received from the VC evaluation module.

The waitlist queue 144 stores the user name and network address for each performer in the queue. The user names of the performers in the waitlist queue are stored in sequential order from the first performer in time to the next performer in time. When a first request is received to start a cypher, the requester is the first performer in time, and as such, the requester's user name and network address is stored in the first entry in the waitlist queue. As subsequent requests to start cypher or join cypher are received by the VCE for the same category and performance selection, the requesters' user names and network addresses are added to the next available slots in the waitlist queue in the order received.

When the waitlist module 121 receives a fetch_name signal from the virtual cypher performance module 122, the waitlist modules sends the user name and network address of the first entry [n] to the virtual cypher performance module. The waitlist queue 144 is advanced (i.e., the next in time entry [n+1] advances to entry [n−1]). The waitlist module continues to send the user name and network address for each entry in the waitlist queue each time a fetch_name signal is received until the queue the empty. In addition, the waitlist module advances the queue each time a user name and network address is sent to the virtual cypher performance module. When the waitlist queue 144 is empty, the waitlist module sends an empty_queue error signal to the virtual cypher performance module.

Virtual Cypher Performance Module

The virtual cypher performance module 122 in the computer programs 117 contains instructions that when executed by the microprocessor 114, cause the microprocessor to initiate, in sequential order, a content-specific real-time performance corresponding to the performance selection, for each user in the waitlist queue 144. The virtual cypher performance module receives a user name and network address from the waitlist module 121 for the user-performer. The cypher 134 and performance 136 business rules are used to process the receive content.

The user-performer at the top of the waitlist queue 144 will be prompted to begin their performance. To initiate the performance, the virtual cypher performance module sends a start signal to the user-performer's user interface device 101 and starts the timer. The performance by the user-performer conforms to the customizable user selected features. The performance will have a duration equal to the user-selected performance time, and the size of the performance will be equal to the user-selected performance size. The user-performer will perform to the user-selected performance selection.

The user's performance may include, for example, for a music category selection, the user singing lyrics to the performance selection (e.g., a specific pop song), or the user incorporating instrumentation to the performance selection. For a biblical scripture category, the user's performance may include, for example, the user performing a sermon or oral presentation about the chosen performance selection (e.g., "Psalms 20:4"). For a fitness/exercise category, the user's performance may include, for example, the user demonstrating a variety of exercises for the chosen performance selection (e.g., exercises for abs).

The VCE 112 receives the performance from the user-performer's interface device 101. The performance is received as a live stream and includes header information. The cypher name (i.e., logical streaming channel) is included in the header information. The virtual cypher performance module 122 searches the AC database 141 for the cypher name, extracts the content from the "Viewers" field, and sends/broadcasts the live stream to the user-viewers listed in the "Viewers" field. The virtual cypher performance module may send the live stream to all the user-viewers simultaneously.

When the timer expires for the performance, the virtual cypher performance module 122 sends a fetch_name signal to the waitlist queue module 121 to receive the user name and network address for the next performer. The virtual cypher performance module will initiate a performance by the next performer. The virtual cypher performance module will continue to initiate, in sequential order, real-time performances from each user-performer in the waitlist queue 144 in a continuous fashion until the queue is empty. Thus, the virtual cypher provides back to back real-time performances by the users-performers linked to the same cypher name, and all of the performances are done to the same performance selection.

The performance is limited to a predetermined time period, such as, for example, fifteen (15) minutes, thirty (30) minutes, etc. In some embodiments, each category has a predefined time period for performances. The music category may include, for example, a time period of ten (10) minutes. The religious text/scripture category may include, for example, a time period of thirty (30) minutes. The fitness/exercise category may include, for example, a time period of fifteen (15) minutes.

In some embodiments, the predefined time period may be set dynamically, for example, the time period may be set by the system or by a user.

Memory

The memory 116 may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Alternatively, memory 116 may be implemented in a single storage device having a plurality of files or a plurality of segmented memory tables operating under the control of a database management system (not shown), but which may be incorporated into the memory 116 or which may be a separate microprocessor. The memory 116 may house a user database 140 for storing user profiles, AC database 141 for storing information related to active cyphers, a C&P database 142 for storing category and performance selection data, a C&S database 143 for storing user content subscriptions, a waitlist queue 144 for storing a list of performers, and a buffer for buffering live streaming data.

User Interface Device

As illustrated in FIG. 1, user interface devices 101a-b include microprocessors 102a-b, VCE applications 103a-b, and network interfaces 104a-b. User interface devices 101a-b, can be any computer processing device, such as, for example, a mobile phone, laptop, desktop, any kind of handheld computer processing system, a personal computer, minicomputer, microprocessor, workstation, mainframe, or similar computing platform. Each user interface device includes memory, communication modules, display, user interface and applications (all not shown). The communication modules include a network module, such as, for example, a wireless network card, for communication with network system 110 and performance assessment computing system 112. The communication modules can be microprocessors embedded with computer readable instructions that when executed perform various communication functions.

User interface devices 101a-b include a controller and data storage device (not shown). The controller can include one or more microprocessors, computer readable memory (e.g., read-only memory (ROM), random access memory (RAM), mechanisms and structures for performing I/O operations. The controller can execute an operating system for execution on the central processing unit and one or more application programs to control the operation of the user interface devices. The data storage device stores one or more databases, the operating system and one or more application programs.

The VCE applications 103a-b, which may comprise multiple hardware or software modules, contain program instructions that cause the microprocessors 102a-b to perform a variety of specific tasks required to receive/send data from/to VCE 112. The network interfaces 104a-b are provided to establish a connection to VCE 112. The network interfaces 104a-b may also provide connectivity to remote terminals and remote computer systems (not shown).

Network System

Network system 110 may include a plurality of computers or servers (not shown) located in many different geographic locations. The servers may include, for example, web servers, streaming servers, and media servers. The network system may comprise, for example, a wide area network (WAN), a local area network (LAN) or the Internet. The network system provides communication among the devices in the computer system using one or more communications protocols, such as, for example, hypertext transfer protocol (HTTP), transmission control protocol (TCP), file transfer protocol (FTP), real-time transfer protocol (RTP), real-time streaming protocol (RTSP) and real-time transport control protocol (RTCP).

In another exemplary embodiment, a virtual cypher may be created for a specific category solely, without a performance selection. In this embodiment, the virtual cypher provides back to back real-time performances, all related to a specific category. The performance may include a variety of performance selections, where all the performance selections are related to the same category.

In another exemplary embodiment, a virtual cypher may be created for a specific category solely, without a performance selection. In this embodiment, the virtual cypher provides back to back real-time performances, all related to a specific category. The performance may include a variety of performance selections, where all the performance selections are related to the same category.

Figure 4:
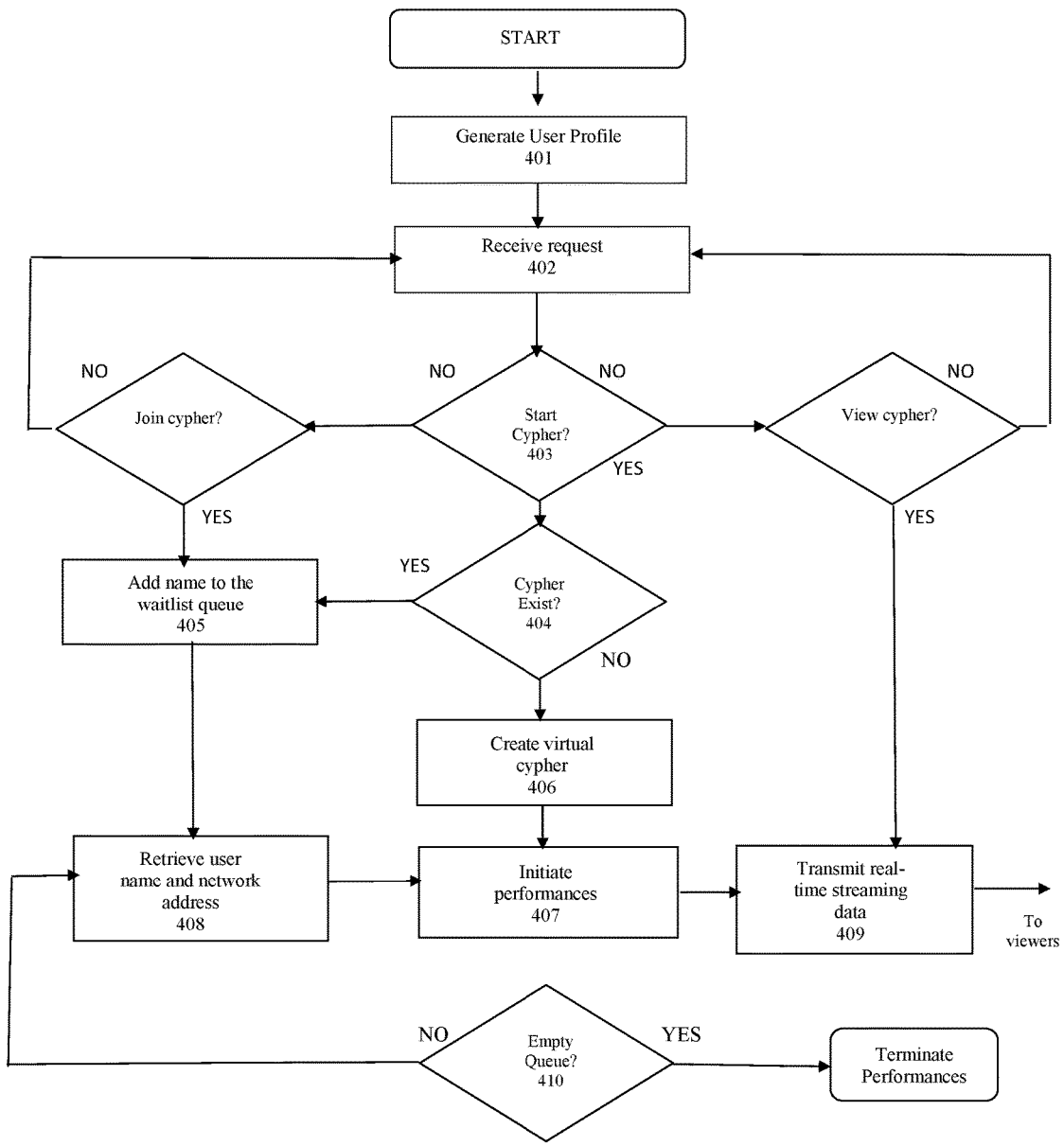
FIG. 4 is a flow diagram illustrating by way of example the steps that may be performed by a computer system to create a virtual cypher for providing continuous on-line content-specific real-time performances using a filtering scheme based on customizable user selected features.

FIG. 4 shows a flow diagram illustrating, by way of example, the steps performed in computer programs 117 that may be implemented in accordance with certain embodiments of the present disclosure, such as, the virtual cypher enterprise ("VCE"), to evaluate a user's skill performance. The steps may be implemented via a conventional computer software program comprising a plurality of related functional modules each having program instructions for execution by the microprocessor 114 of FIG. 1, or it may be implemented by any other suitable machine or device without departing from the scope of the present disclosure.

As illustrated in step 401, the first step includes generating a profile (e.g., see FIG. 2) for a user. When a new user registers to use the VCE application 102, the VCE 112 generates a profile for the user. Next, at step 402, the VCE receives a cypher request from a user via one of the user interface devices 101a-b. The user may send a join cypher, view cypher or start cypher request.

At step 403, the VCE determines if the request is a start cypher request. If the request is a start cypher request, then at step 404 the VCE determines whether a virtual cypher has already been created for the category and performance selection designated by the user in the start cypher request. The start cypher request includes a category, such as, for example, "Music", and a performance selection, such as, for example, "Jazz track 43". The VCE searches the AC database 141 for the selected category and performance selection.

If the VCE finds a matching entry in the active cypher database, then at step 405 the VCE adds the user's name to waitlist queue 144. If the VCE does not find a matching entry in AC database 141, then at step 406 the VCE creates a virtual cypher for the user selected category and performance selection. The VCE creates the virtual cypher by linking user-performers and user-viewers to a logical streaming channel for sending and receiving the content-specific real-time performances.

The VCE 112 links the user-performers and user-viewers to a logical streaming channel using AC database 141. As illustrated in FIG. 3, each entry in the active cypher database includes the fields "Cypher Name", "Category", "Performance Selection", "Performance Size", "Performance Time", "Performers", and "Viewers". The VCE creates an entry in the AC 141 database for the new virtual cypher and assigns a waitlist queue 144 to the virtual cypher.

The VCE 112 assigns a cypher name to the virtual cypher. The cypher name identifies the name designated for the logical streaming channel corresponding to the virtual cypher, such as, for example, logical streaming channel "AZ". The VCE 112 stores the user's customizable selected features received with the user's request in the corresponding fields of the virtual cypher's entry in AC database 141, (i.e., "Category", "Performance Selection", "Performance Size", and "Performance Time". Each start a virtual cypher request is required to include the user's customizable selected features.

The "Performer" field contains a list of the virtual cypher's user-performers. The VCE 112 extracts the user-performers from waitlist queue 144. After the VCE assigns the waitlist queue 144 to the virtual cypher, the VCE stores the name of the user who requested to start the virtual cypher as the first performer in the waitlist queue. The VCE stores the names of the users from all subsequent requests to either join the virtual cypher or to start a virtual cypher having the same category and performance selection as the already created virtual cypher in the waitlist queue 144 in the order the requests were received. In addition to storing the names of the user-performers, the VCE stores the network address of each user-performer's user interface device 101 in the "Performer" field with the user-performer's name.

The "Viewers" field contains a list of the virtual cypher's user-viewers. The list of user-viewers is compiled from content subscription database 143, user connections, and received view virtual cypher requests. The content subscription database 143 stores a list of subscribers for each category of content within a type of content. For example, for virtual cypher content, the content subscription database stores a list of subscribers to a category of content or to a category and performance selection of content. A user may, for example, subscribe to religious text content in general (i.e., a category), and/or a user may subscribe to religious text content specific to Psalms 23 (i.e., a category and performance selection).

In another exemplary embodiment of this disclosure, the type of content may include any type of web content, such as, for example, news forums, blogs, discussion boards, applications, e-services, images, audio and video files and Web pages.

The VCE 112 searches the content subscription database 143 and extracts the user name and network address of subscribers to the category matching the virtual cypher's category and extracts the user name and network address of subscribers to the category and performance selection matching the category and performance selection of the virtual cypher. The VCE stores the extracted information in the "Viewers" section of the virtual cypher's entry in AC database 141.

The VCE 112 stores the user name and network address of each user connection for each user-performer listed in the "Performer" field of the virtual cypher's entry in AC database 141 in the "Viewers" section of the virtual cypher's entry.

The VCE 112 stores the user name and network address of each user submitting a request to view the virtual cypher in the "Viewers" section of the virtual cypher's entry in AC database.

At step 407, the VCE 112 initiates, in sequential order, a content-specific real-time performance corresponding to the performance selection, for each user in the waitlist queue. At step 408, the VCE 112 retrieves a user name and network address of the first entry in the waitlist queue 144 and sends a start signal to the user-performer and starts the timer for the performance. The performance will conform to the user's customizable selected features. For example, the user's customizable selected features may include category <"Music">, performance selection <"Jazz track 43">, performance size <"individual">, performance time <"fifteen (15) minutes">. In this instance, the performance will include an individual user performance to Jazz track 43 for fifteen minutes. The corresponding virtual cypher created by the VCE will provide continuous real time streaming of each individual user-performer's performance to Jazz track 43 for fifteen minutes.

The VCE 112 receives the performance from the user-performer's user interface device 101 as a live stream and sends/broadcasts the live stream to all of the user-viewers listed in the "Viewers" field at step 409. When the timer expires for the performance, the VCE retrieves the user name and network address for the next user-performer and initiates a performance by the next performer. At step 410, the VCE will continue to loop to steps 407, 408 and 409 until the waitlist queue 144 is empty. The VCE may retrieve the user name and network address of each user-performer in the waitlist queue 144 and initiate, in sequential order, content-specific real-time performances from each user-performer in the waitlist queue until the waitlist queue is empty. When the waitlist queue 144 is empty, the VCE terminates the initiation of performances.

If the VCE 112 receives a join cypher request, the user name and network address of the requester is stored in the waitlist queue and the VCE continues to steps 407-410. If the VCE receives a view cypher request, the user name and network address of the requester is stored in the "Viewer" field of the virtual cypher's entry in the AC database 141 and the user-viewer will thereafter receive all of the content-specific real-time performances associated with the virtual cypher.

In another exemplary embodiment of this disclosure, the virtual cypher enterprise (VCE) includes a performance database (not shown) in memory 116 for storing the real-time performances received from the user-performers.

The disclosed embodiments are not inclusive, and many other modifications and variations will be apparent to someone of ordinary skill in the art with construction skills in the related arts. Further, the steps of the disclosed methods can be modified in various manners, including by reordering steps, executing multiple steps concurrently, and/or inserting or deleting steps, without departing from the principles of the invention. Together the descriptions and accompanying illustrations seek to provide an explanation of the basic principles of the embodiment and its application. It is therefore intended that the specification and embodiments be considered as exemplary only.

Those skilled in the art will recognize and appreciate that FIGS. 2-3 are non-limiting examples of various profiles and tables that could be utilized according to some embodiments of the present disclosure, and that suitable profiles and tables may also include a greater or fewer number of fields, as well as different field values, without departing from the scope of the present invention.

Some embodiments may be implemented, for example, using a machine or tangible computer-readable medium or article which may store an instruction or a set of instructions that, if executed by a machine, may cause the machine to perform a method and/or operation in accordance with the embodiments. Such a machine may include, for example, any suitable processing platform, computing platform, computing device, processing device, computing system, processing system, computer, microprocessor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

The machine-readable medium may include any mechanism for storing, transmitting, or receiving information in a tangible form readable by a machine, and the medium may include a tangible medium through which the program code may pass, such as antennas, optical fibers, communications interfaces, etc. Program code may be transmitted in the form of packets, serial data, parallel data, etc., and may be used in a compressed or encrypted format.

Program code, or instructions, may be stored in, for example, volatile and/or non-volatile memory, such as storage devices and/or an associated machine readable or machine accessible medium including, but not limited to, solid-state memory, hard-drives, floppy-disks, optical storage, tapes, flash memory, memory sticks, digital video disks, digital versatile discs (DVDs), etc., as well as more exotic mediums such as machine-accessible biological state preserving storage.

The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An apparatus for creating a virtual cypher for providing content-specific real-time performances based on a filtering scheme using customizable user selected features, the apparatus comprising:
   at least one user interface device;
   a network system;
   a virtual cypher enterprise ("VCE") comprising:
      at least one hardware microprocessor configured to perform a predefined set of logic operations in response to receiving a corresponding basic instruction selected from a predefined native instruction set of machine codes;
      a memory;
      a first database, stored in the memory, for storing performance selection data;
      a second database, stored in the memory, for storing user profiles;
      a network interface;

a profile generator module, in the memory, having program instructions that, when executed by the microprocessor, cause the microprocessor to generate a user profile for a new user;

a determination module, in the memory, having program instructions that, when executed by the microprocessor, cause the microprocessor to determine whether a virtual cypher has been created for a category and performance selection when a cypher request is received from a user, the category and performance selection are received with the cypher request, wherein the category selection is selected from a plurality of different categories of content and the performance selection is selected from a plurality of different selections all related to the selected category;

a VC creator module, in the memory, having program instructions that, when executed by the microprocessor, cause the microprocessor to create a virtual cypher conforming to the user's customizable selected features when the VCE determines that a virtual cypher has not been created for the category and performance selection;

a waitlist module, in the memory, having program instructions that, when executed by the microprocessor, cause the microprocessor to add the user to a waitlist queue for the virtual cypher when the determination module determines that a virtual cypher has been created for the category and performance received with the user's request;

a virtual cypher performance module, having program instructions that, when executed by the microprocessor, cause the microprocessor to initiate, in sequential order, a content-specific real-time performance corresponding to the performance selection, for each user in the waitlist queue; and an electronic communication channel for transmitting received real-time streaming data corresponding to the performance of each user to viewers of the virtual cypher.

2. The apparatus of claim 1, wherein the virtual cypher links users to a logical streaming channel to send and receive the content-specific real-time performances.

3. The apparatus of claim 2, wherein the users are linked to the logical streaming channel using a database record.

4. The apparatus of claim 1, wherein the customizable user selected features include a category, a performance selection, a performance size and a performance time.

5. The apparatus of claim 4, wherein the performance size includes at least one from the group comprising i) individual user and ii) collective user.

6. The apparatus of claim 5, wherein each performance of a collective user size includes performances made by multiple users during the same performance time.

7. The apparatus of claim 4, wherein the content-specific real-time performance has a time duration for the performance based on the performance time.

8. The apparatus of claim 1, wherein each virtual cypher has an associated waitlist queue and timer.

9. The apparatus of claim 1, wherein the category includes at least one from the group comprising of i) music, ii) religious/spiritual text, iii) exercise/fitness, v) recipes or vi) dance.

10. The apparatus of claim 1, wherein each user interface device includes a camera for capturing real-time video and a microphone for capturing audio.

11. A method for creating a virtual cypher for providing content-specific real-time performances based on a filtering scheme using customizable user selected features using a virtual cypher enterprise (VCE), the VCE comprising at least one hardware microprocessor configured to perform a predefined set of logic operations in response to receiving a corresponding basic instruction selected from a predefined native instruction set of machine codes, the method comprising the steps:

generating, by the VCE, a user profile page for a new user;

determining, by the VCE, whether a virtual cypher has been created for a category and performance selection when a cypher request is received from a user, the category and performance selection are received with the cypher request, wherein the category selection is selected from a plurality of different categories of content and the performance selection is selected from a plurality of from a plurality of different selections all related to the selected category;

creating, by the VCE, a virtual cypher conforming to the user's customizable selected features when the VCE determines that a virtual cypher has not been created for the category and performance selection;

adding, by the VCE, the user to a waitlist queue for the virtual cypher when the VCE determines that a virtual cypher has been created for the category and performance received with the user's request;

initiating, by the VCE, in sequential order, a content-specific real-time performance corresponding to the performance selection, for each user in the waitlist queue; and transmitting, by the VCE, real-time streaming data corresponding to the real-time performance for each user to viewers of the virtual cypher.

12. The method of claim 11, wherein the virtual cypher links users to a logical streaming channel to send and receive the content-specific real-time performances.

13. The method of claim 12, wherein the users are linked to the logical streaming channel using a database table.

14. The method of claim 11, wherein the customizable user selected features include a category, a performance selection, a performance size and a performance time.

15. The method of claim 14, wherein the performance size includes at least one from the group comprising i) individual user and ii) collective user.

16. The method of claim 15, wherein each performance of a collective user size includes performances made by multiple users during the same performance time.

17. The method of claim 14, wherein the content-specific real-time performance has a time duration for the performance based on the performance time.

18. The method of claim 11, wherein each virtual cypher has an associated waitlist queue and timer.

19. The method of claim 11, wherein the category includes at least one from the group comprising of i) music, ii) religious/spiritual text, iii) exercise/fitness, v) recipes or vi) dance.

20. The method of claim 11, wherein each user interface device includes a camera for capturing real-time video and a microphone for capturing audio.

* * * * *